3,033,842
PROCESS OF PRODUCING WATER-INSOLUBLE POLYMERS OF POLYVINYL ALCOHOL

Rosemarie Holtschmidt, Essen-Heisingen, Germany, assignor to TH. Goldschmidt A.G., Essen 1, Germany
No Drawing. Filed Jan. 18, 1960, Ser. No. 2,851
Claims priority, application Germany Jan. 31, 1959
13 Claims. (Cl. 260—91.3)

It is known that cyanuric chloride reacts with hydroxyl compounds, such as water, alcohols and phenols, forming the corresponding cyanuric acid derivatives with separation of HCl. The reaction takes place in steps, that is, the first Cl-atom reacts at 0–5° C., the second at 45–50° C. and the third at about 100° C. The presence of bases enhances the reaction. In the reaction of cyanuric chloride with aliphatic alcohols, HCl-acceptors are indispensable, otherwise the Cl-atoms would be exchanged against OH-groups, forming cyanuric acid and alkyl chlorides.

The reactivity of the homologous alcohols with cyanuric chloride diminishes considerably, as shown, with the rising number of C-atoms. Secondary alcohols also react very slowly. In glycols the second OH group reacts much slower than the first group, even if both hydroxyl groups are bound primarily.

The reaction by the cyanuric chloride with an hydroxyl compound is shown in the following reaction formula showing the successive step by step reactions for displacement of the chlorine atom:

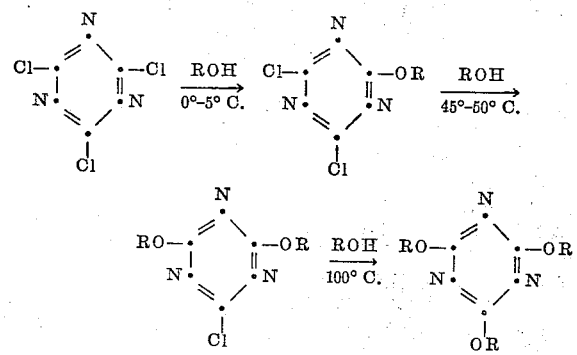

In all these cases the desired product can only be produced by re-esterification of the corresponding hydroxyl compounds with cyanuric esters of low alcohols, mainly with trimethyl cyanurate. Additional data about these reactions can be found in an article by I. R. Dudley and co-workers, J. Am. Chem. Soc. 73 (1951), p. 2986.

Polyvinyl alcohol coatings are themselves very valuable since they are non-toxic, colorless, stable, resistant to oil, gasoline, and various other solvents. However, since it is substantially water soluble, it cannot be used where wet or humid conditions prevail. It is therefore an important object of this invention to provide a process of coating with polyvinyl alcohol which renders the coating less water soluble.

A further object of the invention resides in the provision of producing a water insoluble polymer especially adaptable for use as a binding agent for printing inks since such may be in the form of a clear transparent gel.

Yet another object of the invention resides in the provision of a method of reacting polyvinyl alcohol with cyanuric chloride so as to obtain a polymer which is substantially water insoluble and may be used for impregnating textiles and fibrous materials as well as capable of being used as a starting material for synthetic fiber that is compatible with water-soluble resin.

Still a further object of this invention resides in the provision of a method of producing a water-soluble polymer of a polyvinyl alcohol which takes into account the tendency of producing hydrochloric acid during reaction of the polyvinyl alcohol with cyanuric chloride by employing standardized solutions of polyvinyl alcohol having a pH initially ranging between 8 and 9 and having a pH of at least 7 after reaction so that the polyvinyl alcohol is always alkaline.

It was found surprisingly that polyvinyl alcohol, despite the above described slow reactivity of polyvalent alcohols, reacts very easily with cyanuric chloride, forming less water-soluble, thermosetting polymers.

It has been customary up to now to harden polyvinyl alcohol by partly acetylating the hydroxyl groups with suitable aldehydes, particularly $CH_2O$ in an acid medium, thus reducing greatly the hydrophilic property of polyvinyl alcohol.

Other methods achieve an additional cross-linkage between the polyvinyl alcohol chains by using unsaturated aldehydes and by the subsequent addition of diamines or by the reaction with diketones and carboxylic acid hydrazides. In the process according to the invention, a three-dimensional cross-linkage by the triazine radical is made possible, in addition to the partial blocking of the OH-groups. This way modified polyvinyl alcohols with completely new properties are formed.

The reaction of polyvinyl alcohol with cyanuric chloride can take place in three ways as follows:

Firstly, by the action of a solution of cyanuric chloride with an organic solvent, such as acetone, benzene, toluene, etc., on the surface of an article saturated with polyvinyl alcohol or on a molded, dry or little water-containing polyvinyl alcohol article, which contains at least so much alkali that the hydrochloric acid formed during reaction is bound. By heating to over 100° C. during or after the action, the reaction is completed. In this embodiment of the process a very dense cross-linkage of the polyvinyl alcohol is achieved, since the molecule chains lie close together, because of the low water content.

A considerable amount of the available OH groups can be esterified by prolonged action of the cyanuric chloride solution and a high alkali content of the polyvinyl alcohol.

Secondly, by the action of a solution of cyanuric chloride in a suitable organic solvent, which is not mixable with water, on an aqueous, alkaline solution of polyvinyl alcohol. Here too, the reaction takes place mainly at the boundary surface. The more concentrated the polyvinyl alcohol solution is, the smaller is the amount of cyanuric chloride necessary for the cross-linkage, but the use of saturated cyanuric chloride solutions and a slow action is recommended for the production of products that are resistant, for example, to hot water.

A third method of reaction includes the addition of a solution of cyanuric chloride, in a solvent that is mixable with water, such as acetone, dioxane, etc., to a vigorously stirred, aqueous alkaline solution of polyvinyl alcohol.

With dilute aqueous solutions of polyvinyl alcohol, cyanuric chloride reacts so easily at 20° C. that two Cl-atoms are reacted at once. These products still show a good water-solubility when using a 1–2% polyvinyl alcohol solution with a molar ratio of the OH groups to cyanuric chloride of more than 15:1.

They become increasingly water-insoluble by drying and short heating to over 100° C. preferably over 120° C., but they still have a great swelling capacity; prolonged heating leads to polymers which swell little, even in hot water. If the molar ratio of OH groups to cyanuric chloride is reduced below 15:1 and/or if polyvinyl alcohol solutions with more than 2% solid content are used, clear gels are formed after a reaction of a few seconds already, which are completely insoluble in water and which can be liberated of the inorganic by-products by dialysis.

The polyvinyl alcohol, modified according to the process of the invention, is obtained in a highly diluted form when using the third method, for example, and must be concentrated in the vacuum before use. In order to avoid annoying foaming, it is advisable to add a low, water-soluble alcohol or a corresponding amine in small amounts, such as methanol, ethanol, ethylene diamine, etc. It was found that these additions can be added before the concentration, that is, during the reaction itself, so that end products with particularly good properties are obtained.

It is advisable to add the alcohols in such quantities that a molar ratio of alkanol/cyanuric chloride of 1.5:1 is not exceeded, and to add the amines in such quantities that a molar ratio of amine/cyanuric chloride of 0.8:1 is not exceeded.

In the above-mentioned methods the pH value must be over 7 during and after the reaction in order to obtain a sufficient cross-linkage. A reduction of the OH-ion concentration results in the formation of free cyanuric acid and in a partial chlorination of the polyvinyl alcohol. It is therefore of advantage to use a polyvinyl alcohol which contains only few acetate groups, because a considerable portion of the base used is bound by the acetic acid formed in the saponification that takes place simultaneously with the reaction according to the invention.

The properties of the polymeric cyanuric esters of polyvinyl alcohol produced according to the invention widen considerably the range of application of these known polymers. The new products can be used with advantage wherever the water-solubility of polyvinyl alcohol prevents its application.

In particular the water-soluble polymers obtained according to the third method, which are hardenable after molding by heating alone without the application of chemicals, offer many possible uses, for example, for the production of impregnating agents for textiles and fibrous materials, of binding agents for printing inks, as well as lacquer and plastic ingredients. They can also be used as starting materials for synthetic fibers. They are compatible with water-soluble resins.

*Example 1*

A 1% aqueous solution of a polyvinyl alcohol is standardized with 1 N soda solution to a pH of 8–9. Fiberglass fleece or other suitable article is saturated with this solution and dipped after drying for several minutes into a saturated solution of cyanuric chloride in benzene. After the benzene has evaporated, the fleece is washed with water and dried for 15 minutes at 130° C. This impregnation is water insoluble and resistant to boiling water and hot NaOH.

*Example 2*

A 4% aqueous solution of a polyvinyl alcohol is standardized with a 1 N soda solution to a pH of 8–9. The solution is poured in a thin layer into a glass dish and covered with a thin layer of a practically saturated solution of cyanuric chloride in benzene. After a few hours the benzene is poured off. The resulting gel can be boiled for hours in water without dissolving.

*Example 3*

10 ml. of a 10% solution of cyanuric chloride in acetone are added in drops under vigorous stirring to 300 ml. of a 1% polyvinyl alcohol solution, standardized to a pH of 9 by means of 1 N soda solution. The pH value should be over 7 after the reaction is completed. This very stable solution can be concentrated in the vacuum, for example, an impregnation produced with it on any base material is absolutely stable on boiling after drying and heating to over 100° C. preferably 120° C.

*Example 4*

5 ml. of a 10% cyanuric chloride solution are added under vigorous stirring to 300 ml. of a 4% polyvinyl alcohol solution, standardized to a pH of 8–9. After a few seconds a solid gel is formed which is completely insoluble in water.

*Example 5*

100 ml. of a 1.1% polyvinyl alcohol solution are mixed with 1 g. methanol, then the solution is made alkaline by means of dilute NaOH, and 3.3 g. cyanuric chloride, dissolved in acetone, are added under vigorous stirring. The pH value is kept alkaline during the reaction by the addition of dilute NaOH. The solution is concentrated in the vacuum to a solid content of 6%.

*Example 6*

1000 ml. of a 1.1% polyvinyl alcohol solution are mixed with 150 mg. acetylene diamine, then the solution is made alkaline with dilute NaOH and 3.3 g. cyanuric chloride, dissolved in acetone, are added under vigorous stirring. The pH value is kept alkaline during the reaction by adding dilute NaOH. The solution is concentrated in the vacuum to a solid content of 6%.

Thus it can be seen that there has been defined a process for cross-linking polyvinyl alcohol to form a water-insoluble polymer, which comprises the steps of reacting with polyvinyl alcohol standardized to a pH of between 8 and 9, a relatively small amount of a solution of cyanuric chloride, after which the polymer is washed and then dried at a temperature preferably over 100° C.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A process for reducing the water solubility and swelling capacity of polyvinyl alcohol, which comprises cross-linking by condensing water-containing polyvinyl alcohol in an alkaline medium with cyanuric chloride to cross-link said polyvinyl alcohol three-dimensionally.

2. A process for reducing the water solubility and swelling capacity of polyvinyl alcohol, which comprises reacting an aqueous solution of about between 0.5 to 20 percent by weight of polyvinyl alcohol and about between 0.5 to 6 percent by weight calculated on the amount of polyvinyl alcohol of an alkali selected from the group consisting of alkali metal hydroxide and alkali metal carbonate with a quantity of cyanuric chloride sufficient to obtain a cross-linked reaction product.

3. A process for reducing the water solubility and swelling capacity of polyvinyl alcohol by cross-linking, which comprises reacting an aqueous solution of about between 0.5 to 20 percent by weight of polyvinyl alcohol and about between 0.5 to 6 percent by weight calculated on the amount of polyvinyl alcohol of an alkali selected from the group consisting of alkali metal hydroxide and alkali metal carbonate with a quantity of cyanuric chloride sufficient to obtain a pH value of approximately 8 in the reaction mixture, whereby a cross-linked polyvinyl alcohol reaction product is obtained, and heating the reaction product to between 90 and 120° C.

4. A process for reducing the water solubility and swelling capacity of polyvinyl alcohol, which comprises reacting a water-containing mass of between about 20 to 99 percent by weight of polyvinyl alcohol and about between 0.1 to 5 percent by weight calculated on the amount of polyvinyl alcohol of an alkali selected from the group consisting of alkali metal hydroxide and alkali metal carbonate with a quantity of cyanuric chloride sufficient to obtain a reaction mixture having a substantially neutral pH value, whereby a three-dimensionally cross-linked polyvinyl alcohol reaction product is obtained.

5. A process as claimed in claim 4, wherein the reaction product is heated to between about 90 to 120° C.

6. A process for reducing the water solubility and swelling capacity of polyvinyl alcohol, which comprises cross linking an aqueous mass of 0.5 to 99 percent of polyvinyl alcohol and 0.1 to 6 percent by weight calculated on the amount of polyvinyl alcohol of an alkali with a quantity of cyanuric chloride sufficient to obtain a substantially neutral cross-linked polyvinyl alcohol reaction product.

7. A process as claimed in claim 6, wherein said aqueous mass contains a water soluble lower aliphatic alcohol in an amount of from between 1 to 20 percent calculated on the amount of polyvinyl alcohol.

8. A process as claimed in claim 6, wherein said aqueous mass contains a water soluble lower aliphatic amine in an amount of from 1 to 20 percent calculated on the amount of polyvinyl alcohol.

9. A process as claimed in claim 6, wherein said cyanuric chloride is added to said aqueous mass in solid form.

10. A process as claimed in claim 6, wherein said cyanuric chloride before being added to said aqueous mass is dissolved in a water soluble organic solvent.

11. A process as claimed in claim 6, wherein said cyanuric chloride before being added to said aqueous mass is dissolved in an organic solvent which is immiscible with water.

12. Process for cross-linking polyvinyl alcohol to form a coating comprising the steps of saturating an article to be coated with an aqueous solution of polyvinyl alcohol having a pH of between 8 and 9, at least partially drying said article, then immersing said article in a saturated solution of cyanuric chloride in benzene, evaporating said benzene, washing said article with water, and then drying said article for about 15 minutes at 130° C.

13. Process for cross-linking polyvinyl alcohol to produce a substantially water insoluble gel comprising the steps of adding a 10% cyanuric chloride solution while stirring vigorously to a 4% polyvinyl alcohol solution having a pH between 8 and 9.

References Cited in the file of this patent
UNITED STATES PATENTS

| | | |
|---|---|---|
| 2,169,250 | Izard | Aug. 15, 1939 |
| 2,306,410 | Schinzel | Dec. 29, 1942 |